United States Patent [19]
Puglisi et al.

[11] 4,162,878
[45] Jul. 31, 1979

[54] SAFETY LATCH SYSTEM

[75] Inventors: Thomas C. Puglisi, Kensington; Kurt M. Strobel, Southington, both of Conn.

[73] Assignee: Litton Industrial Products, Inc., New Britain, Conn.

[21] Appl. No.: 853,394

[22] Filed: Nov. 21, 1977

[51] Int. Cl.² .............................................. B29F 1/00
[52] U.S. Cl. ..................................... 425/152; 100/53; 425/151
[58] Field of Search ....................... 425/151, 152, 153; 100/53; 74/615, 613; 192/134

[56] References Cited

U.S. PATENT DOCUMENTS

| | | | |
|---|---|---|---|
| 2,201,244 | 5/1940 | Root | 425/152 |
| 2,415,462 | 2/1947 | Cherry et al. | 425/153 |
| 3,728,057 | 4/1973 | Grundmann | 425/151 X |
| 3,877,858 | 4/1975 | Smith | 425/152 |
| 3,913,413 | 10/1975 | Walker | 100/53 |

FOREIGN PATENT DOCUMENTS

| | | | |
|---|---|---|---|
| 2520876 | 11/1976 | Fed. Rep. of Germany | 425/152 |
| 1395694 | 3/1965 | France | 100/53 |
| 45-76650 | 8/1970 | Japan | 425/151 |
| 854902 | 11/1960 | United Kingdom | 425/153 |

*Primary Examiner*—William R. Briggs
*Attorney, Agent, or Firm*—Brian L. Ribando

[57] ABSTRACT

An injection molding machine having a safety gate slidable to a closed position to block access to a mold space includes a lever and a latch which cooperate with an adjustable safety bar mounted on a movable platen of the molding machine to prevent the safety gate from being opened during a machine cycle. The lever and the latch also prevent the machine from operating when the safety bar is not properly adjusted.

9 Claims, 3 Drawing Figures

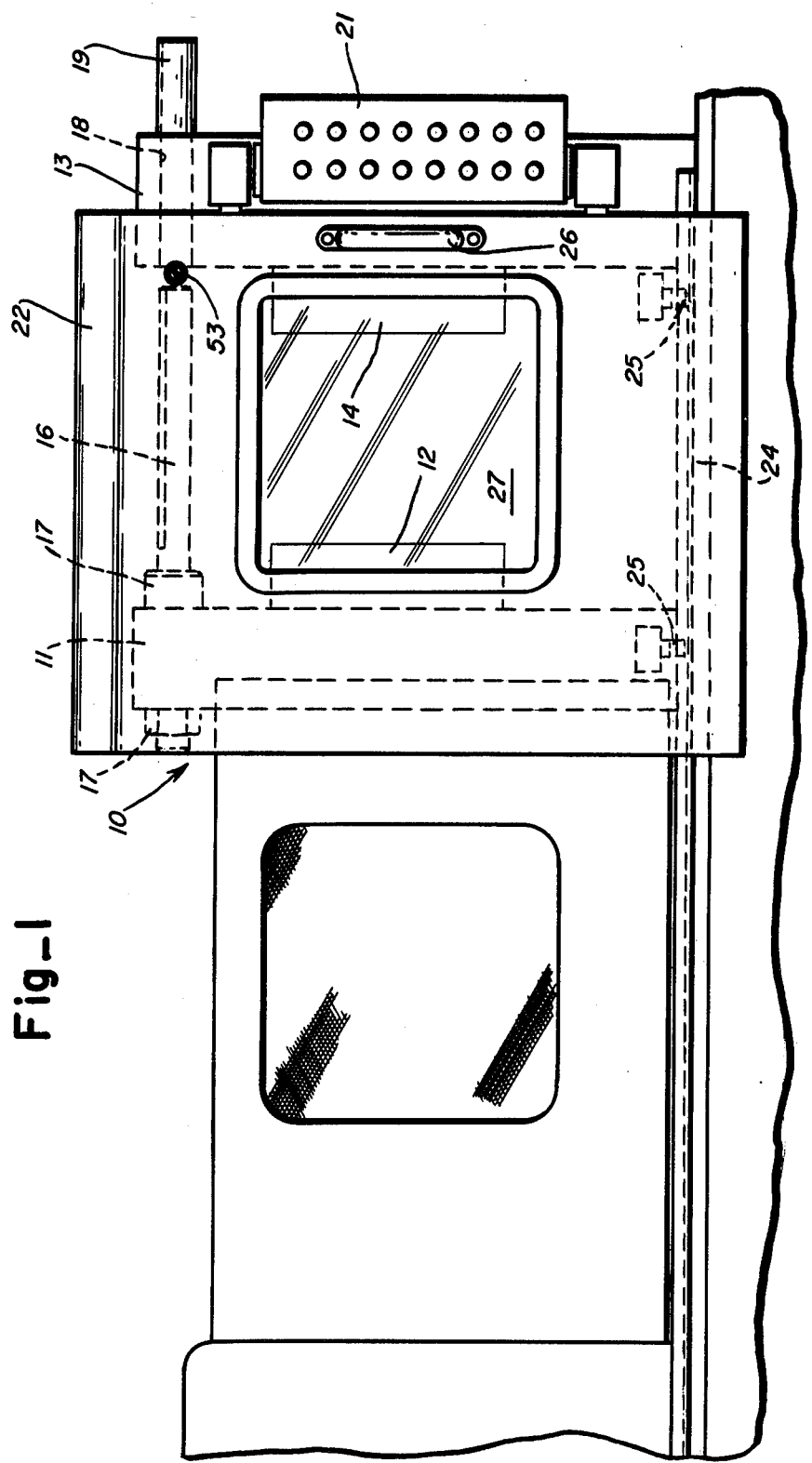

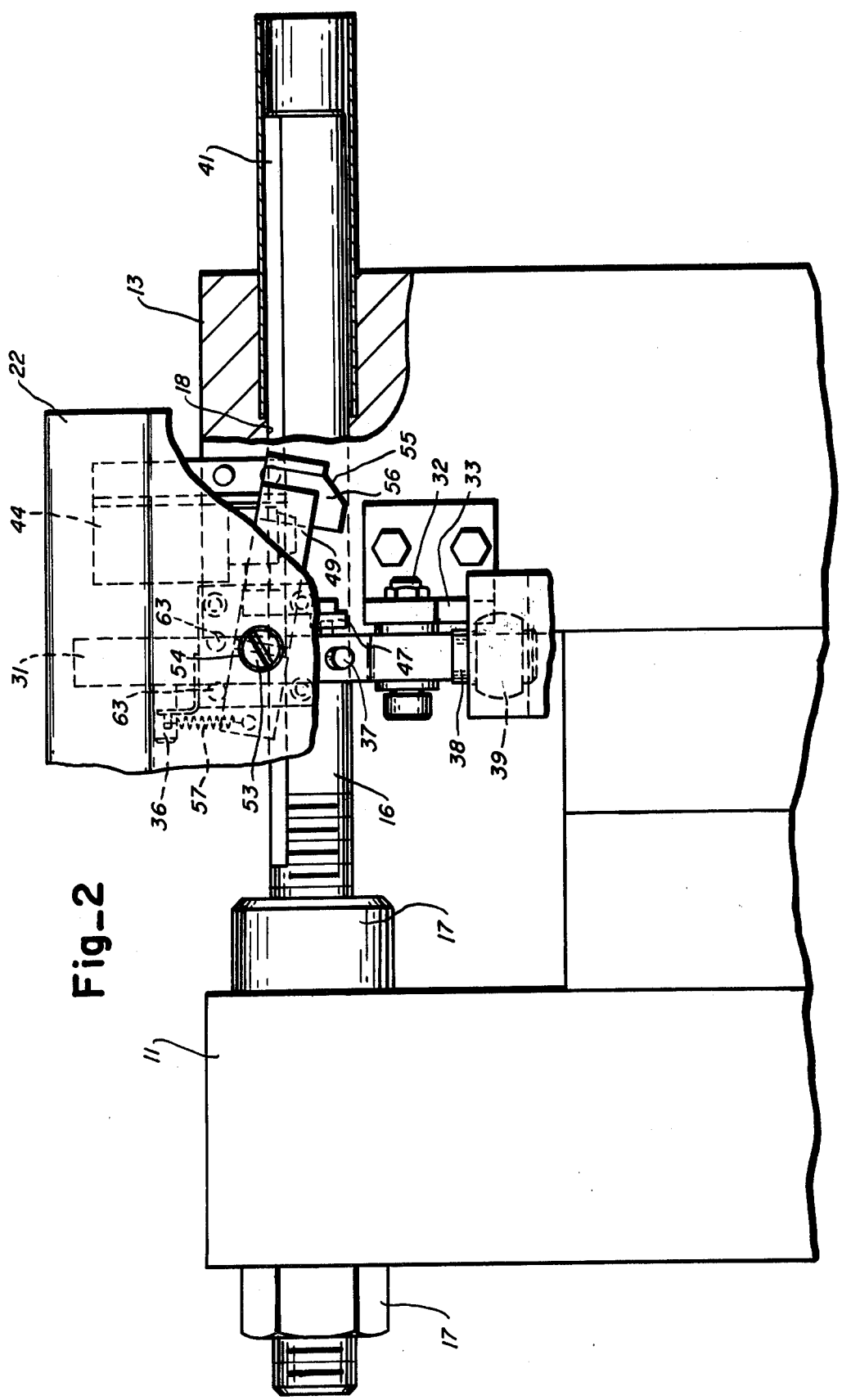

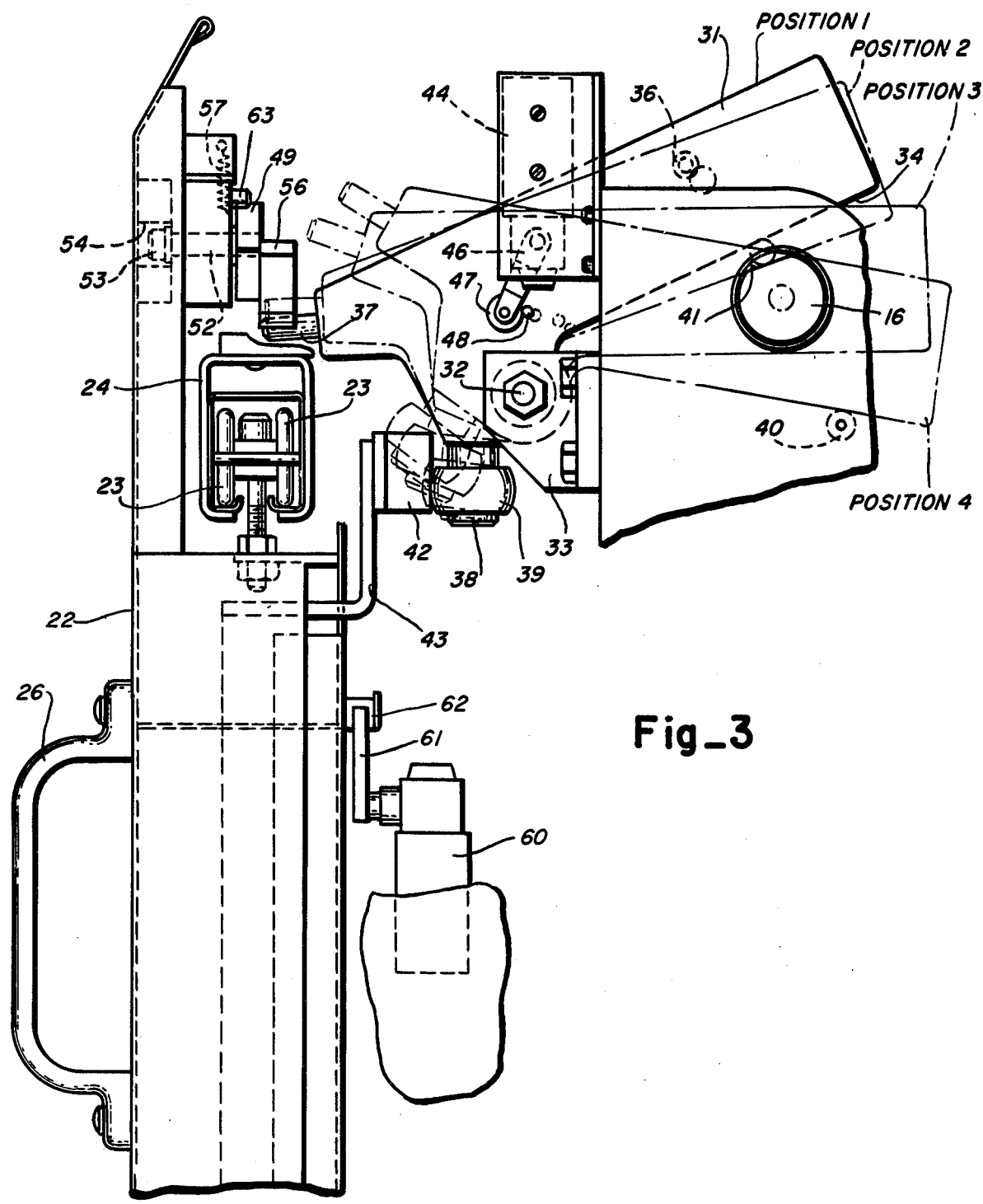
Fig_3

SAFETY LATCH SYSTEM

BACKGROUND OF THE INVENTION

The invention relates to a lever and latch in a safety mechanism for a plastic injection molding machine having a safety gate.

A safety gate insures that an operator does not extend his hand or other portion of his body into a dangerous position between the mold halves whenever the machine hydraulic pumps and control valves are in a condition to close the mold. Since the forces involved are considerable, if an operator's hand or other parts of his body are caught between the mold halves, the injury which is incurred is severe. Various safety mechanisms have been devised in order to insure that the hydraulic control valves which control the functions of the machine are deenergized whenever the safety gate is slightly opened. Such safety mechanisms normally take the form of limit switches and hydraulic valves which sense the closed or open position of the safety gate and deenergize the control valves whenever the gate is open. While such mechanisms should prevent accidents, the switches and the valves may become defective and in some instances, in order to save time and to increase the output of the machine, operators tamper with such devices, rendering them inoperative.

One solution to this problem has been achieved by the mechanical safety mechanism disclosed in U.S. Pat. No. 3,386,133 issued on June 4, 1968. In that patent, there is disclosed a mechanical linkage connected between the safety gate and a guide rod which is secured to the movable platen. Whenever the safety gate is slightly opened, a pawl is inserted into a notched guide bar in order to restrain the movable platen against advance. A second solution is shown by U.S. Pat. No. 3,728,057 issued on Apr. 17, 1973. In that patent, a movable platen is steadied by one or more guide bars, at least one of which has notches or other stop members thereon. A pawl is engaged with the guide bar for physically preventing the advance of the movable platen, and mechanical linkage is connected between the pawl and the safety gate, which linkage includes a torque shaft. Movement of the safety gate rotates the torque shaft to control the positioning of the pawl with respect to the guide bar.

SUMMARY AND OBJECTS OF THE INVENTION

In accordance with the present invention, an injection molding machine having two mold halves which are movable relative to one another for opening and closing a mold cavity formed therebetween includes a safety gate which is slidable from an open to a closed position. In the closed position, access is blocked to the mold space. A movable platen on which one of the mold halves is mounted has fixed thereto a safety bar, and a safety lever and a safety latch cooperate with one another and with the safety bar to prevent the opening of the safety gate when a molding cycle is in progress. The machine is prevented from executing a molding cycle if the safety gate is not in a closed position. Additionally, the safety lever and latch prevent the safety gate from being closed if the safety bar is not properly adjusted.

It is therefore an object of the present invention to provide a lever and latch mechanism which cooperates with the safety gate on a molding machine to control the operation thereof.

It is another object of the invention to provide a lever and latch mechanism which cooperates with the safety gate on a molding machine and with a safety bar mounted on the movable platen thereof to control the operation of the machine.

It is another object of the invention to provide a safety lever and a safety latch to prevent the opening of the safety gate on a molding machine when a molding cycle is in progress.

It is still another object of the invention to provide a safety lever and latch mechanism which prevents the closing of the safety gate on a molding machine unless a safety bar mounted on the movable platen of the machine is properly adjusted.

These and other objects of the invention will become apparent from the following detailed description taken in conjunction with the accompanying drawing figures in which like reference numerals designate like or corresponding drawing parts throughout the figures.

BRIEF DESCRIPTION OF THE DRAWING

FIG. 1 is a front view of an injection molding machine according to the invention;

FIG. 2 is a partial sectional view of the machine of FIG. 1; and

FIG. 3 is a partial end view of the machine of FIG. 1.

DESCRIPTION OF THE PREFERRED EMBODIMENT

Referring now to the drawings, there is shown in FIG. 1 an injection molding machine generally designated by reference numeral 10. The machine comprises a movable platen 11 having a mold half 12 mounted thereon, and a stationary platen 13 having a mold half 14 mounted thereon. The movable platen 11 and the mold half 12 are reciprocated by a suitable mechanism such as a toggle, not shown, which is well known in the art and forms no part of the present invention. Attached to the movable platen 11 is a threaded safety bar 16. The setting of the safety bar 16 relative to the movable platen 11 is adjustable and may be fixed by means of locking nuts 17. The end of the safety bar opposite the movable platen 11 is slidably received by a passage 18 formed in the stationary platen 13 and by a sleeve 19 which is fixed to the stationary platen.

The molding machine further comprises a control panel 21 for regulating the operation of the machine, and a safety gate 22. The safety gate is mounted for translation across the machine front by means of a plurality of rollers 23 and slides 25 which are movable along guide ways 24. Movement of the safety gate 22 from an open to a closed position is facilitated by means of a handle 26, and the safety gate is provided with a window 27 for viewing the operation of the machine when the gate 22 is in a closed position, as shown.

Turning now to FIGS. 2 and 3, better understanding of the lever and latch mechanism of the present invention may be obtained. The lever 31 is mounted by means of a pivot pin 32 to a suitable support 33. The support 33 may be attached to a portion of the molding machine frame. The lever 31 comprises a rest edge 34, and a rest pin 36 is mounted on a side of the lever 31. The geometry of the lever 31 is such that gravity induces the lever to pivot about pin 32 in a clockwise direction. A latch pin 37 is mounted on an end of the lever 31 which is generally opposite the location of the rest pin 36. Attached to the lower portion of the lever 31 is a shaft 38, and a roller 39 is rotatably secured to the shaft. It should be understood that the safety bar 16 is capable of blocking the swing of the lever 31, in which instance, the rest edge 34 of the lever 31 is in contact with the flat 41 which is formed on the safety bar 16. Also, the safety bar 16 may be retracted by opening the mold halves to a position where the end of bar 16 is closely adjacent the lever 31. In this position, the lever 31 is blocked in its downward swing by contact of the rest pin 36 on the flat 41. A stop 40 is attached to a portion of the machine frame and limits the downward swing of lever 31 in certain operating circumstances which are detailed more fully below.

A camming surface 42 is supported by a bracket 43, which bracket is mounted on the safety gate 22. The position of the camming surface 42 on the safety gate 22 is such that engagement by the roller with the cam as shown occurs only when the gate is in a fully closed position. This engagement causes the lever to pivot to a Position 1 which is shown. In this position, the rest edge 34 of the lever 31 is out of contact with the safety bar 16. This allows the bar 16 to reciprocate as the movable platen 11 cycles the mold half from an open to a closed position relative to mold half 14 without wear of either the edge 34 or the flat 41.

In normal operation of the machine, the lever 31 may assume three other posiitions. In Position 2, the camming surface 42 is withdrawn from contact with roller 39 and the rest edge 34 is supported on flat 41 of the safety bar 16. In Position 3, the safety bar 16 is withdrawn by the movable platen 11 to a position in which the rest pin 36 of lever 31 is supported on the flat 41. In Position 4, the rest edge 34 is supported on the stop 40.

A switch 44 is mounted to the machine frame and includes a movable arm 46 and a roller 47. The arm 46 is spring biased and causes the roller 47 to follow an abutment 48 which is mounted on lever 31 and which describes a circular path as lever 31 pivots to one of its four positions. The switch 44 controls power to the machine pumps and is made or closed when lever 31 is in either Positions 1, 2 or 3. When lever 31 is in Position 4, the switch 44 is open and no power is supplied to the machine pumps rendering the machine inoperative. A second switch 60 is mounted to the machine frame and includes a spring loaded arm 61. An abutment 62 is mounted on safety gate 22 and the switch 60 is positioned so that the arm 61 is contacted by the abutment 62 only when the gate is in a fully closed position to make or close the switch. When switch 60 is made, power is supplied to the hydraulic control circuits of the machine which allow the mold halves to close.

The mechanism further comprises a latch 49 which is mounted on the door 22 by a pin 52. The door 22 includes a passage for the pin 52 which allows pivoting thereof and of the latch 49 which is nonrotatively attached to the pin. The pin 52 is formed with a slotted head 53, which is disposed in a recess 54. The latch 49 includes a hook 56 having a bevel 55, and the latch is biased by a spring 57 which is fastened between one end of the latch 49 and a suitable mounting surface on the safety gate. The rotation of the latch 49 is limited by the provision of two stops 63. It will be seen from the drawings, that when the lever 31 is disposed in either Position 1 or Position 2, the latch pin 37 will be in a blocking position relative to the hook 56 to prevent the safety gate from being opened from a closed position. When the lever 31 is disposed in Position 3 or Position 4, the lever 31 will block the safety bar 16 preventing the movable platen from closing the mold halves. When the rest edge 34 of the lever 31 is against the downstop 40, the switch 44 is open, as detailed above, and the hydraulic pumps of the molding machine stop. Additionally, an alarm may be arranged to sound when the switch 44 is deactivated.

The operation of the device is as follows. When the mold is open and the gate is open, the switch 60 and a hydraulic safety valve (not shown) prevent the mold from being closed. When the safety bar is correctly set, and the mold is open, the lever 31 rests by means of pin 36 on the flat 41 of the safety bar 16. At this time, the safety gate may be closed and the latch pin 37, in Position 3, will not block the passage of the latch 49. With the gate fully closed, the camming surface 42 acting on the roller 39 biases the lever 31 to the Position 1. In this position, the rest edge 34 of lever 31 will be raised out of contact with the flat 41 of the safety bar 16 avoiding wear of the edge 34 on flat 41 as the bar 16 is reciprocated by the movable platen 11. Also, when the gate 22 is fully closed, switch 60 and the hydraulic safety valve (not shown) will be made to power the machine pumps circuit allowing the mold halves to be closed. If an operator attempts to open the safety gate when the clamp is closed, the withdrawal of the camming surface 42 from engagement with the roller 39 causes the lever 31 to drop to the position where the rest edge 34 is supported by the flat 41 of the safety bar 16. In this position, the gate is prevented from opening by more than a very small amount by the hook 56 which engages the latch pin 37. The opening of the safety gate this small amount breaks the switch 60 causing the machine cycle to be interrupted. Thereafter, if the mold is in any position other than a fully opened position, a tool such as a screwdriver must be used to engage the slotted head 53 of pin 52 to rotate the latch 49 to a position where it is not blocked by the latch pin 37. If the safety bar 16 is properly adjusted on the movable platen 11, the end of the safety bar 16 should be about ⅛ inch from the side of the lever 31 when the mold is fully open and the lever 31 will be supported in Position 3. If the safety bar is adjusted so as to be too short, the lever 31 will drop onto the stop 40 into Position 4, in which position all electric power to the machine pumps is cut by switch 44. When the safety bar is adjusted too long, the rest edge 34 of the lever 31 remains supported by the flat 41 in Position 2 and the hook 56 is blocked by the latch pin 37, which blocking prevents the gate from being opened. With the lever 31 in such a position, the gate 22 may be opened only a small amount from the closed position, that is, only an amount until the hook 56 is caught on the latch pin 37. With the gate 22 slightly open, the switch 60 is not activated and the mold halves cannot be closed. Also, with the lever 31 in this position, the gate 22, if fully open, can be partially closed only to a position where the hook 56 is blocked by the latch pin 37. Again, with the gate 22 only partially closed, the switch 60 will not be activated and the mold is prevented from being closed. In order to open or close the gate 22, the latch 49 must be manually rotated by means of a tool in engagement with the slotted head 53 so that the latch pin will be cleared.

We claim:

1. In an injection molding machine having first and second mold halves, said mold halves being mounted on first and second platens which are movable to cycle said mold halves from an open position to a closed position and back to an open position, and a safety gate which is movable from an open position allowing access to the mold halves to a closed position in which access is blocked, a mechanism comprising:

first means pivotally mounted on said machine and responsive to the closed position of said safety gate to pivot to a first position, safety bar means mounted on the first platen and responsive to the closed position of said mold halves for supporting the first means in a second position, second means pivotally mounted and positioned on said safety gate for latching with the first means in the first and the second positions to prevent the opening of the safety gate when the mold halves are in the closed position, and a rest pin mounted on said first means, said rest pin being supported by said safety bar means to pivot said first means to a third position when the mold halves are open, said first means in the third position allowing the opening of the safety gate.

2. The mechanism of claim 1 further comprising means for adjusting the mounting of said safety bar means on said first platen, said first means pivoting to the third position when the mold halves are opened and the safety bar is properly adjusted, said first means pivoting to a fourth position when the mold halves are opened and the safety bar is adjusted too short, and the first means remaining in the second position when the mold halves are opened and the safety bar is adjusted too long.

3. The mechanism of claim 2 further comprising:
a threaded surface on said safety bar means and threaded fastening member comprising said means for adjusting.

4. The mechanism of claim 1 further comprising:
a stop attached to said machine, said stop supporting said first means in a fourth position when the mold halves are open to allow the opening of the safety gate.

5. The mechanism of claim 4 further comprising:
an abutment on said first means,
a switch mounted on said machine, and
means on said switch for following the pivotal motion of said abutment, whereby said switch prevents the operation of the machine when the first means pivots to the fourth position.

6. The mechanism of claim 1 further comprising:
a switch mounted on said machine,
an abutment mounted on said safety gate,
means on said switch for following said abutment as said safety gate translates from a closed to an open position, whereby said switch prevents the mold halves from closing when said safety gate translates from a closed to an open position.

7. The mechanism of claim 1 further comprising:
a stop attached to said machine, said stop supporting said first means in a fourth position when the mold halves are open to allow the opening of the safety gate.

8. The mechanism of claim 7 further comprising:
an end on said safety bar means remote from said first platen, said first means, in said third and fourth positions, abutting said end to prevent the closing of the mold halves by motion of said first platen.

9. In an injection molding machine having first and second mold halves, said mold halves being mounted on first and second platens which are movable to cycle said mold halves from an open position to a closed position and back to an open position, and a safety gate which is movable from an open position allowing access to the mold halves to a closed position in which access is blocked, a mechanism comprising:

first means pivotally mounted on said machine and responsive to the closed position of said safety gate to pivot to a first position, safety bar means mounted on the first platen and responsive to the closed position of said mold halves for supporting the first means in a second position, second means pivotally mounted and positioned on said safety gate for latching with the first means in the first and the second positions to prevent the opening of the safety gate when the mold halves are in the closed position, rest pin means for supporting said first means in a third position and allowing the safety gate to open when the mold halves are open and for preventing said first means from pivoting to a fourth position, and switch means mounted on said machine for preventing the operation of the machine when the first means pivots to the fourth position.

* * * * *